US006457375B1

(12) United States Patent
Buch (10) Patent No.: US 6,457,375 B1
(45) Date of Patent: Oct. 1, 2002

(54) RACK AND PINION ASSEMBLY FOR USE WITH STEERING MECHANISM OF MOTOR VEHICLES

(76) Inventor: Terry C. Buch, 11234 Haggie Rd., Wilton, CA (US) 95693

(*) Notice: Subject to any disclaimer, the term of this patent is extended or adjusted under 35 U.S.C. 154(b) by 0 days.

(21) Appl. No.: 09/625,551

(22) Filed: Jul. 25, 2000

(51) Int. Cl.⁷ ............................ F16H 35/00; B62D 5/06; B62D 3/12
(52) U.S. Cl. ...................... 74/388 PS; 74/422; 180/428; 280/93; 280/515
(58) Field of Search ............................. 74/388 PS, 422, 74/498; 180/428; 280/93.515, 93.514; 248/316.1

(56) References Cited

U.S. PATENT DOCUMENTS

| | | | |
|---|---|---|---|
| 3,347,109 A | * 10/1967 | Adams et al. | 74/388 PC |
| 4,653,339 A | * 3/1987 | Komatsu et al. | 74/422 |
| 4,815,552 A | * 3/1989 | James | 180/148 |
| 4,865,149 A | * 9/1989 | Rohrback et al. | 180/148 |
| 4,887,683 A | * 12/1989 | Klosterhaus et al. | 180/148 |
| 4,939,947 A | * 7/1990 | Toyoshima et al. | 74/422 |
| 5,921,520 A | * 7/1999 | Wisniewski | 248/316.1 |
| 6,270,124 B1 | * 8/2001 | Nanko | 285/15 |

* cited by examiner

Primary Examiner—David A. Bucci
Assistant Examiner—Timothy McAnulty

(74) Attorney, Agent, or Firm—R. Michael West; Boutin, Dentino, Gibson, Di Giusto, Hodell & West (57) ABSTRACT

A modular, bolt-in, rack and pinion assembly for replacing an existing steering gear box in a motor vehicle. A rack tube, including a pair of elongated slots in its sidewall, houses the rack. The rack tube is mounted to existing holes in the frame of the motor vehicle by means of a plurality of brackets. The rack has a tooth portion and a shaft portion. A pair of studs projects transversely from the shaft portion of the rack, each stud passing through a receptive slot. The studs are mounted to an elongated center link. The vehicle's factory tie rod assemblies are bolted to either end of the center link. A pinion housing is secured over a proximate end of the rack tube, maintaining a pinion gear in threaded engagement with the rack. In a manual embodiment of the invention, an outer end of the pinion is connected directly to the steering wheel shaft. In a powered embodiment, a servo having its own pinion gear is bolted to the pinion housing. An input shaft of the servo is connected to the steering wheel shaft. The servo has high and low pressure supply ports for interconnection to a hydraulic pump, powered by the vehicle's engine. The servo also includes output ports, connected to left hand and right hand stainless steel hard line. The other ends of the hard lines are connected in spaced relation to a distal end of the rack tube. In the powered embodiment, this distal end also houses a power shaft, connected to an end of the rack. A hydraulic plunger, bolted to an outer end of the power shaft, is effective to translate the rack in reciprocating fashion, in response to fluid pressure changes in the hard lines.

41 Claims, 9 Drawing Sheets

RACK AND PINION ASSEMBLY FOR USE WITH STEERING MECHANISM OF MOTOR VEHICLES

CROSS-REFERENCE TO A RELATED APPLICATION

Applicant has a copending design patent application, entitled RACK AND PINION STEERING GEAR FOR MOTOR VEHICLES, Ser. No. 29/121,106, filed Apr. 3, 2000, which is related to the subject matter herein.

BACKGROUND OF THE INVENTION

1. Field of the Invention

The invention relates generally to improvements in steering mechanisms for motor vehicles. More specifically, the invention pertains to a modular, bolt-in, rack and pinion assembly, which has both manual and powered configurations, and which may be retrofitted to an older motor vehicle by replacing the existing steering box.

2. Description of the Prior Art

A select number of the automobiles built in years past have become collectors' classics. For example, the muscle cars of the 1960's, including the Ford Mustang, the Pontiac GTO, the Chevrolet Corvette, and many others of that era, have either been restored, or maintained in original condition, While these motor vehicles have classic styling and highly sou&-after large displacement engines, they all share one common characteristic: their steering mechanisms display undue mechanical play, slow response, and poor centering capabilities. Rebuilding the existing steering gear boxes of these vehicles using new gears and new bearings may reduce the mechanical play somewhat, but the end result still does not approach the performance of modem steering mechanisms.

Automobile designers have long recognized the advantages of a rack and pinion construction for steering mechanisms, but their utilization in the 1960's was generally limited to sports cars. Such a construction utilizes a bar, or rack, having teeth along one of its sides, adapted to engage with the teeth of a pinion gear. The pinion gear is connected at one end to the steering wheel shaft, and the rack is connected to the tie rods of the steering system. The circular motion of the steering wheel is converted into rectilinear motion, for translating the tie rods of the steering system.

Most rack and pinion constructions are "end-driven", in that the pinion engages a median, toothed portion of the rack, and the driven shaft portions of the rack extend outwardly, on either end of the rack housing. This results in a relatively long overall dimension, for the rack and pinion system. Another construction for a rack and pinion is termed a "center-driven" system. In this arrangement, the pinion engages an end toothed portion of the rack, and the driven shaft portion of the rack is centrally positioned. This construction is inherently more compact than the "end-driven" design.

Efforts have been made to retrofit older vehicles with more modern steering mechanisms, such as those incorporating above-described rack and pinion constructions. Unfortunately, installation of the prior art upgrade steering mechanisms have required that the frame of the older vehicle be subjected to cutting, welding, and drilling. Not only are such modifications time consuming and costly, but they are irreversible. Thus, the vehicle can never be restored to its original condition, if that be the desire of the current or a subsequent owner. The need exists, then, for a retrofit system which merely bolts into existing holes.

Further, many prior art systems, particularly those which are "end-driven", change the inner and/or outer tie-rod assemblies of the vehicle. This is necessitated by the fact that the "end driven" rack and pinion is so long, that the existing tie-rods have to be replaced with shorter tie-rods. Such modifications may induce more "bump steer" into the steering mechanism, than existed in the unmodified vehicle. "Bump steer" is the undesirable characteristic of the steering wheel being rotationally displaced when the wheel of the vehicle hits a bump in the road's surface. It is desirable, then, for a retrofit system to use the existing components of the motor vehicle's steering system to the extent possible, so as not to increase the extent of "bump steer".

In addition, some car owners want a power assisted steering system, which utilizes a hydraulic pump powered by the vehicle's engine. Others seek an upgrade to a higher performance steering system, but want to retain the direct "feedback and feel" of manual steering. Prior art upgrade systems are not modular in design, so each power assisted and manual system has to be custom adapted for each vehicle. Moreover, prior art upgrade systems have no capability for fast and easy changeover, from a manual system to a powered system.

Consequently, the need exists for a high-performance steering assembly which can simply be bolted into the existing holes in the frame and control arm brackets of a vehicle, eliminating the necessity of cutting, welding, or drilling the frame or chassis.

The need also exists for a steering assembly which utilizes existing tie rod assemblies, so that "bump steer" will not be increased.

The need further exists for a steering assembly which is modular in design, allowing the installation either of a powered or a manual system, or a quick and easy change from one to the other.

SUMMARY OF THE INVENTION

The present invention provides a modular, bolt-in, rack and pinion assembly, of "center-driven" design, adapted for replacing an existing steering gear box in a motor vehicle. The assembly includes a specially designed rack tube, which is readily adaptable either for manual or powered operation. The rack tube is secured to the frame and to the existing control arm brackets using brackets with split rings. The split rings are easily and quickly bolted together, circumferentially to surround the rack tube and secure it to the underside of the motor vehicle. A rack, including a tooth portion and a shaft portion, is located with the rack tube. A pinion housing is secured to a proximate end of the rack tube, with the tooth portion of the rack extending therein. A bearing, and a bushing, are respectively provided within the pinion housing and at the other end of the rack, to maintain the rack in axial alignment with the rack tube.

When the assembly is configured for powered operation, a hydraulic servo is mounted to the pinion housing. The servo has high and low pressure supply ports for interconnection to a hydraulic pump, powered by the vehicle's engine. The hydraulic servo includes its own pinion gear, adapted to engage the tooth end of the rack. The hydraulic servo also includes output ports, respectively connected to one end of a left hand and one end of a right hand stainless steel hard line. The other ends of the hard lines are connected to a distal end of the rack tube, in spaced relation, as explained below.

The rack tube is modified for powered operation by adding certain components. A power shaft is mounted on the end of the shaft portion of the rack. A hydraulic plunger is mounted on the free end of the power shaft. An inner end plug and an outer end plug are installed in the distal end of the rack tube, defining a hydraulic chamber therein. The hydraulic plunger is positioned within the hydraulic chamber, intermediate the inner plug and the outer plug. The left hand hard line is connected to the inner plug, and the right hand hard line is connected to the outer plug, both lines being in hydraulic communication with the hydraulic chamber. Changes in relative pressure between the two lines effect right or left hand movement of the hydraulic plunger and the rack connected thereto. In effect, these modifications create a hydraulic ram which is structurally integrated within the distal end of the rack tube, and mechanically connected to the rack.

The rack tube also includes a pair of elongated slots in its sidewall, between the proximate end and the distal end. A pair of studs projects transversely from the shaft portion of the rack, each stud passing through a respective slot and a slide bushing therein. Tubular spacers are provided over the intermediate portions of the studs. The outer ends of studs are mounted to an elongated center link. The spacers maintain the center link and the shaft portion of the rack in parallel, spaced relation.

The vehicle's factory tie rod assemblies are bolted to either end of the center link. When rotational forces are applied to the steering wheel of the vehicle, the pinion is rotated and the servo directs hydraulic fluid in the appropriate direction and pressure through the hard lines. In this manner, translational forces are applied to the rack, both through the rotated pinion and through the driven hydraulic plunger, and the tie rods are shifted in accordance with the rotational movement of the steering wheel.

In a manual embodiment of the invention, the hydraulic servo is replaced with a pinion, an outer bearing, and a dust seal. An outer, splined end of the pinion is connected directly to the lower end of the steering wheel shaft. The toothed portion of the pinion engages the rack. The hydraulic power elements, described above for the powered version of the rack tube, are not used. Thus, the previously described hard lines, power shaft, inner and outer plugs, and the hydraulic plunger are eliminated. The holes left in the rack tube by removing these components are sealed off by means of an end plug and a sidewall plug.

Using either the powered or the manual version of the rack and pinion assembly, the steering mechanism of the motor vehicle may be upgraded without any cutting, welding, or drilling of the vehicle's body or frame. Moreover, this upgrade is accomplished without otherwise impairing the "bump steer" characteristics of the vehicle, from those which existed as it was originally manufactured. And, owing to the modular features of the rack and pinion assembly, the mechanism may be changed from a manual version to a powered version by adding a small number of parts, and the mechanism may be modified from left hand drive to right hand drive, by merely reversing the location of certain major components.

These and other objects and features of the present invention will become apparent in the detailed description and the accompanying drawings to follow.

DETAILED DESCRIPTION OF THE PREFERRED EMBODIMENT

Figures 1, 2:
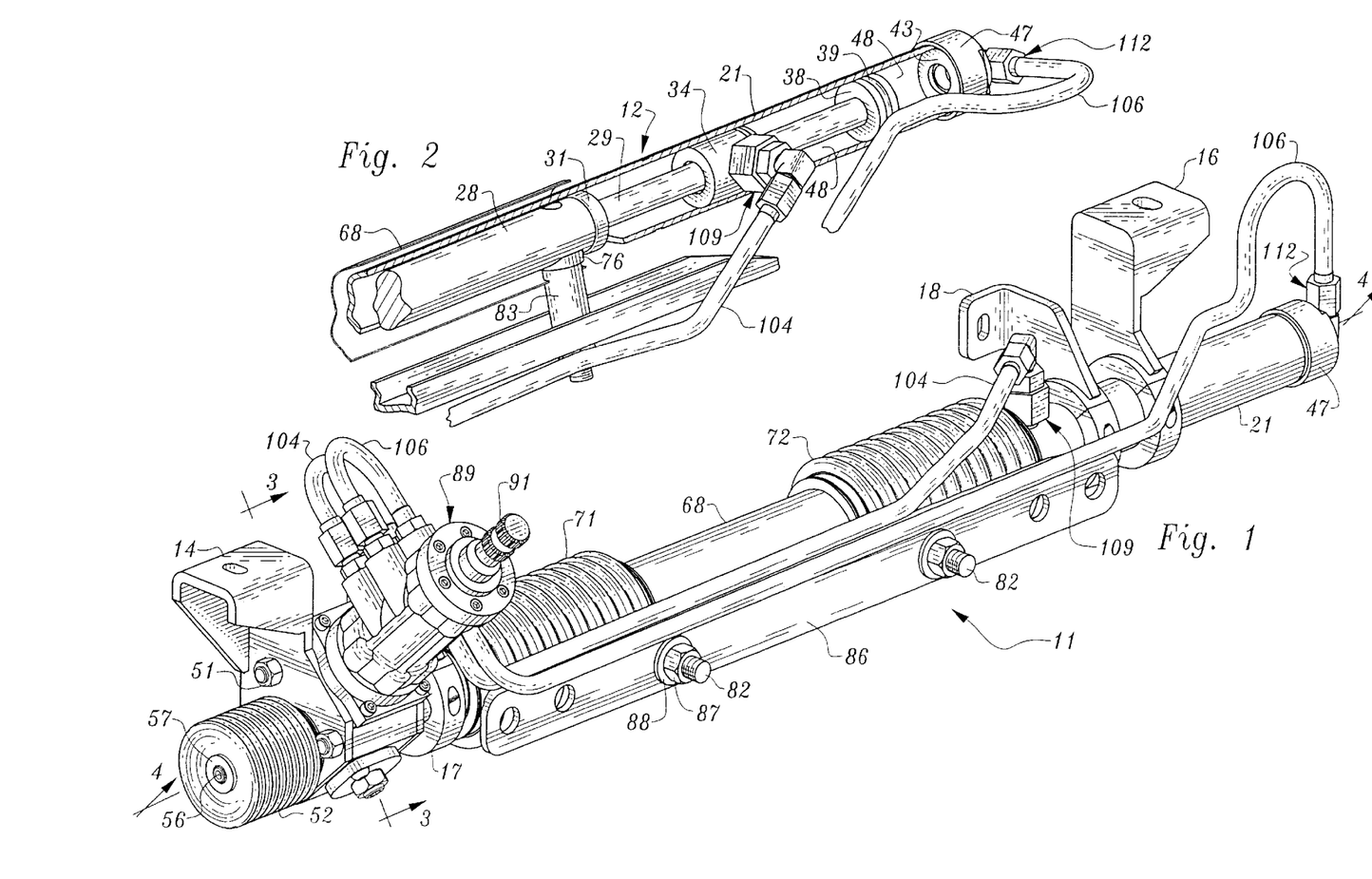
FIG. 1 is a left front perspective the powered version of the rack and pinion assembly of the present invention.
FIG. 2 is a fragmentary, cross-sectional, perspective view of the distal end of the assembly shown in FIG. 1, the assembly being rotated clockwise approximately 90 degrees for clarity.
Figure 12:
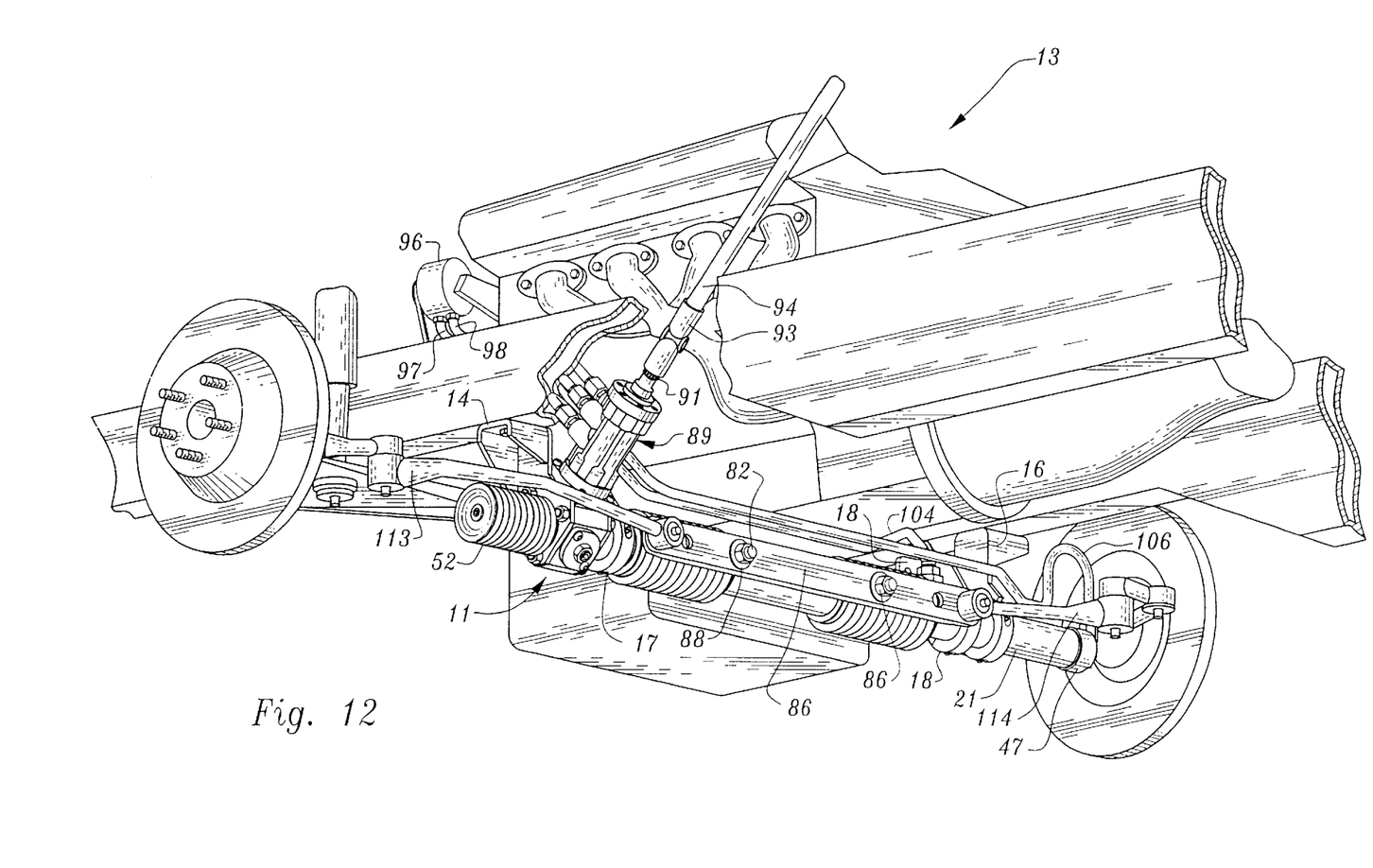

Turning now to FIG. 1, the powered version, or embodiment of the rack and pinion assembly 11 of the present invention is shown. Assembly 11 includes a rack tube 12, adapted to be mounted to the underside of a motor vehicle 13, as shown in FIG. 12. The means for mounting tube 12 includes left and right frame brackets 14 and 16, and left and right control arm brackets 17 and 18. The brackets 14 and 16, and the brackets 17 and 18, are bolted, respectively, to the frame and to the lower control arm mounts, using pre-existing holes in these structures. Brackets 16, 17, and 18 are of split-ring construction, so they can readily be bolt-clamped around the rack tube, after the base portions of the brackets have been bolted to the motor vehicle. In accordance with one of the objectives of the present invention, this manner of installing of the assembly 11 does not require cutting, welding, or fabrication of the vehicle's frame or other under-chassis structural features.

Figure 9:
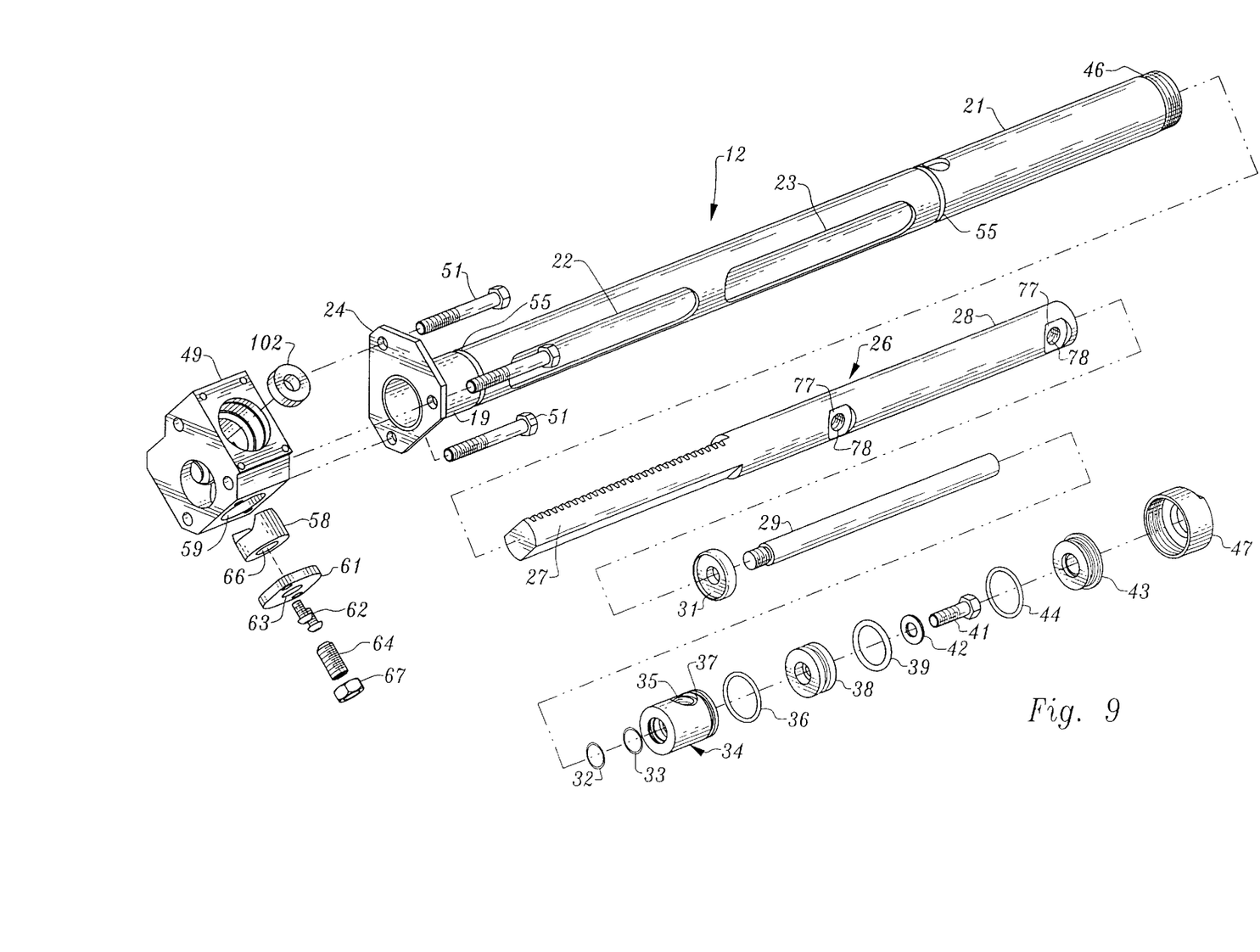
FIG. 9 is an exploded, perspective view of the various components of the powered version of the pinion housing and the rack tube, but not including the hydraulic servo.

Rack tube 12 has a left-hand, proximate end 19, a right-hand, distal end 21, and a pair of elongated slots 22 and 23 therebetween. Slots 22 and 23 share a common axis, which is in parallel, spaced relation to the axis of rack tube 12 A mounting flange 24, shown most clearly in FIG. 9, is welded to proximate end 19. The rack tube is sized and configured to house an elongated rack 26, having a tooth portion 27 and a cylindrical shaft portion 28.

It should be noted at this point that both the rack tube 12 and the rack 26 are modular in nature, in that the same basic tube and rack constructions are used for both embodiments. However, additional and different components are nevertheless added to the basic constructions, depending upon whether the rack and pinion assembly is powered or manual. Therefore, this initial discussion will describe the powered version of the assembly, with the explanation of the manual version to follow.

In the powered configuration of the rack and pinion assembly, both the rack 26 and the rack tube 12 are modified to include additional components, forming part of a hydraulic drive system. This drive system converts applied hydraulic forces into mechanical forces. These mechanical forces are directly coupled to the rack for assisting in the left and night hand translational movement thereof.

To that end, a power shaft 29, is inserted through a guide bushing 31, and the shaft is threadably installed into a distal, tapped end of shaft portion 28. Bushing 31 fits over the distal end of portion 28 as a cap, and is held securely in place by the compressive force of shaft 29. The primary purpose of bushing 31 is to center the distal end of the rack shaft within the rack tube 12. Guide bushing 31 is manufactured from DELRIN material, having the characteristic of being deformable to accommodate any distortions in the inner surface of the rack tube. Bushing 31 is lubricated by heavy grease which surrounds the rack. This heavy grease is retained within the rack tube, and is applied generously to various other movable components, to be described herein.

The free end of shaft 29 passes first through a rod cup seal 32, and then through a D-style wiper seal 33, both secured within the left hand end of an inner end plug 34. The inner diameter of the right hand end of plug 34 is larger than the inner diameter of the left hand end. The stepped transition between the two diameters occurs below a threaded hole 35, passing through the sidewall of plug 34. As a consequence, an annular volume exists between the inner diameter of the right hand end of the plug 34, and the portion of shaft 29 which that inner diameter surrounds. And, since hole 35 passes through the sidewall, it is in communication with the annular volume.

An O-ring 36 is installed within an annular groove 37 on inner end plug 34, to provide a hydraulic seal between inner plug 34 and the inner sidewall of distal end 21. A plunger 38, fitted with a seal 39, is installed into the free end of shaft 29 by means of screw 41 and washer 42. An outer end plug 43 includes an O-ring 44, to provide a hydraulic seal between outer plug 43 and the inner sidewall of distal end 21. Threads 46 are provided on the right hand end of distal end 21. End cap 47 is internally threaded for engagement with threads 46.

After the components described above are assembled as shown in FIG. 9, a hydraulic chamber 48 is defined by the volume within the distal end of rack tube 12, between inner end plug 34 and outer end plug 43 (see, FIG. 2). It should also be noted that plunger 38 is located within an intermediate region of hydraulic chamber 48. Plunger 38 is therefore subject to left hand or right hand translational movement, dependent upon changes in the relative pressures between the two chamber portions. Effectively, the distal end of the rack tube has been modified with the addition of these components to form a hydraulic ram which is structurally integrated with the rack tube. After certain other components are introduced, a more complete description of the operation of the hydraulic assist system will follow.

A pinion housing 49 has one side attached to mounting flange 24 by means of bolts 51. The other side of housing 49 is attached to frame bracket 14, by means of same bolts. The end of tooth portion 27 of rack 26, passes through housing 49, as shown, for example, in FIG. 5A. An outer bellows 52 has one end attached over an annular shoulder 53, extending from bracket 14. A stainless steel tie wrap 54, manufactured by the Panduit Company, compresses the one end of the bellows over shoulder 53. A screw 56, passing through a flanged insert 57, is threaded into a tap in proximate end of the tooth portion of rack 27. The other end of outer bellows 52 is thereby secured to the rack, preventing dirt, dust, and water from contaminating the tooth portion of the rack.

A rack bearing 58 fits within a bore 59, in the lower portion of housing 49. The rack bearing has a bearing surface which corresponds in configuration to the underside of the tooth portion 27. In other words, it has a flat median portion, and upwardly curving sidewall portions. A plate 61, secured by screws 62, is effective to keep bearing 58 within the bore 59. Plate 61 includes a threaded hole 63, which is engaged by adjustment screw 64. As the adjustment screw is advanced toward bearing 58, it impinges upon dished-out recess 66, translating bearing 58 into tighter relation with the underside of tooth portion 27. The position of bearing 58 is adjusted so it is effective to prevent rotation of the toothed portion of the rack, but not so tight that it adds an undesirable degree of mechanical resistance to travel of the rack. When the adjustment is correct, locking nut 67 secures the adjustment screw firmly in place.

A dust tube 68, including apertures 69, is pre-assembled with left-hand inner bellows 71 and right-hand inner bellows 72. Both bellows 71 and 72 include an aperture 46 at their respective inner ends, aligned with a respective underlying aperture 69 in dust tube 68. The inner diameter of each bellows where it engages the outer diameter of the dust tube is such that a reasonably snug fit between the two is afforded. With the dust tube and the bellows pre-assembled, they are ready for installation over the distal end 21 of the rack tube 12.

A left-hand slide bushing 74 and a right hand slide bushing 76 are installed into respective machined flats 77, surrounding a pair of threaded holes 78 in shaft portion 28 of the rack. The spacing of threaded holes 78 is identical to the spacing for apertures 69 in the dust tube 68. The application of heavy grease to one side of the bushings is effective to hold the bushings temporarily in place, during this assembly procedure. The slide bushings are manufactured from hardened steel to reduce wear, and they are sized to roll within slots 22 and 23, as the rack 26 is moved back and forth. Owing to the relatively tight tolerances between the bushings and the adjacent walls of the slots, the bushings provide resistance to any rotation of the shaft portion of the rack. Heavy grease is also applied at this time, to the shaft portion of the rack, substantially filling the annular void between the shaft and the inner wall of rack tube 12.

The pre-assembled dust tube and bellows assembly is slid over the rack tube, so that the apertures 69 are in axial alignment with the bushings and the threaded holes. A first bellows spacer 79 is installed over rack tube 12, and is positioned adjacent the left hand side of slot 22, over a first circumferential recess 55. Then, a second bellows spacer 81 is installed over rack tube 12, and is positioned adjacent the night hand side of slot 23, over a second circumferential recess 55. Each of the bellows spacers is positioned underneath an adjacent end of a respective bellows. The two recesses 55 are provided as locators for the spacers, but they also act to lock the spacers in place when the dust tube and bellows assembly is completely installed. The bellows spacers effectively increase the diameter of the rack tube, so it matches that of the dust tube. This allows the use of standard, commercially available units for the inner bellows 71 and 72, because the diameters of the ends are identical. The bellows spacers 79 and 81 are preferably of single split ring design, and made from DELRIN material. This permits them to be clipped over the rack tube, without breaking.

Each one of a pair of threaded studs 82 is passed first through apertures 46 and 69, and then through a respective slide bushing 74 or 76, before being threaded into a respective hole 78 in the shaft portion of the rack. Spacers 83 are slid first over each stud, and then into each slide bushing. An inner end 84 of each spacer has a flat shoulder portion and a reduced otter diameter end section. The reduced outer diameter section is slightly smaller than the inner diameter of the bushings 74 and 76. However, the longitudinal, axial dimension of the end section is slightly greater than the axial dimension of the bushings 74 and 76. As a consequence, the bushing 74 and 76 rotate freely over the reduced diameter section of each spacer, even when the ends of the spacers are secured in flush engagement with the machined flats 77.

Use of the studs 82, rather than bolts, makes it easier for the user to install the rack and pinion assembly in the motor vehicle. Moreover, preinstallation of the studs into the rack as described above, permits the use of the aforementioned bushing/spacer combination, and enjoyment of the improved performance it provides. And, attempting to thread bolts through the link, the spacers, the bellows, the dust tube, and the bushing, all at one time, would be awkward indeed.

Each outer end of the studs 82 passes through a respective hole in a center link 86. Link 86 is preferably constructed from a steel billet, for strength and resistance to bending forces. Nuts 87 and washers 88 are used to secure the link 86 and the rack 26 together in parallel relation. Spacers 83 maintain the link and the rack apart a sufficient distance so that center link 86 can travel freely throughout its full range of motion, without any mechanical interference with other parts of the assembly. With this aspect of the assembly together and fully aligned, the ends of both inner bellows are then secured in place, using the previously mentioned tie wraps 54.

Figure 3:
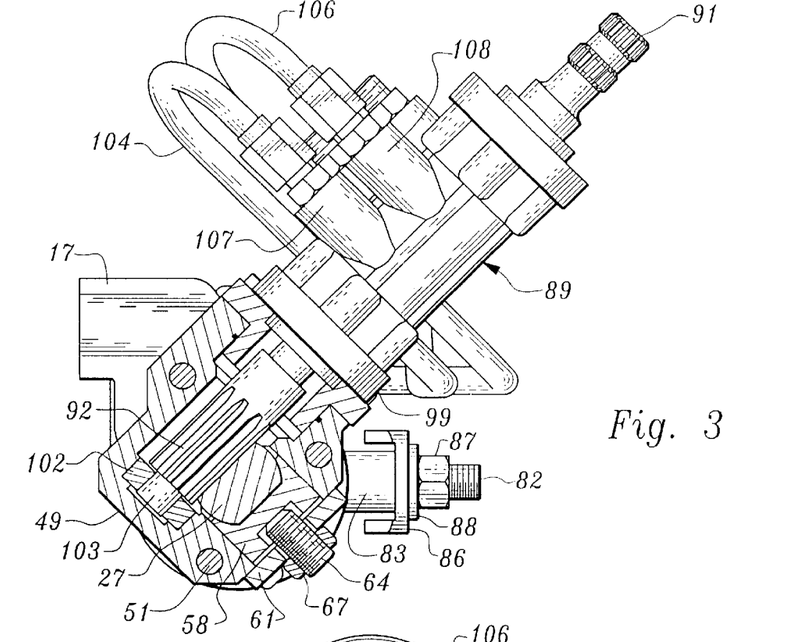
FIG. 3 is a fragmentary, cross-sectional, end elevational view of the proximate end of the assembly, taken on the line 3—3, shown in FIG. 1.
Figure 4:
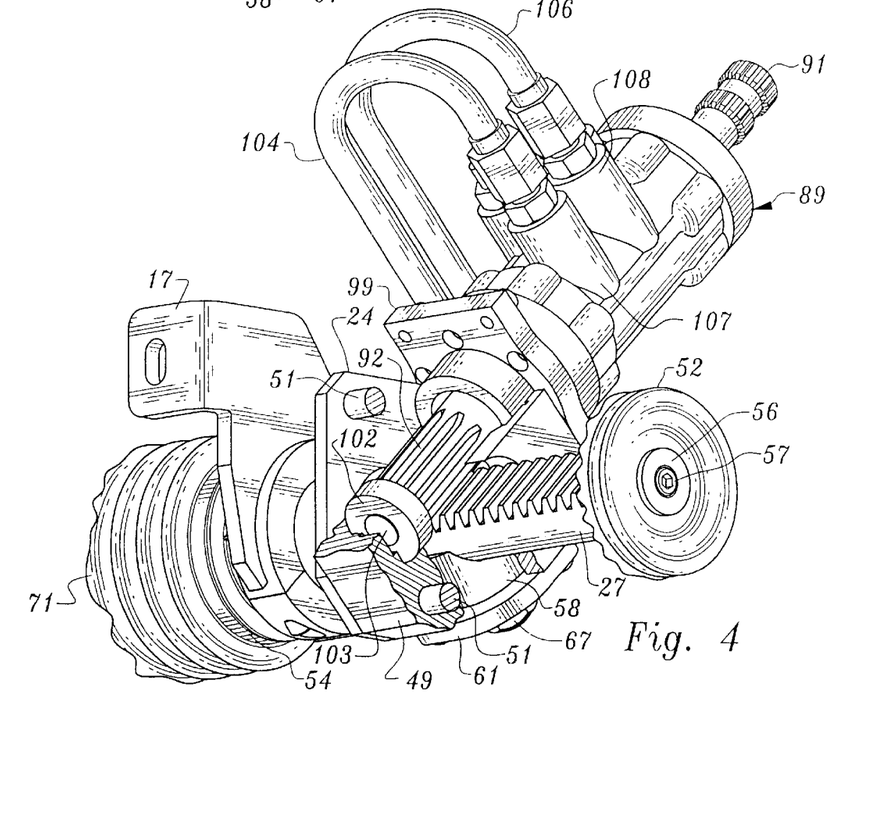
FIG. 4 is a fragmentary, cross-sectional, perspective view, taken on the line 4—4, shown in FIG. 1.

The heart of the powered version of the invention is the hydraulic servo 89. The servo presently used in the commercial embodiment of the invention is the Model VA 800X power servo, manufactured by Woodward Precision Steering Components, of Casper, Wyo. The servo 89 includes a spline 91 and an eight tooth pinion gear 92. The spline 91 is connected, usually by way of a universal joint 93, to the lower end of the steering wheel shaft 94 (see, FIG. 12). The servo is powered by a hydraulic pump 96, connected to the servo by high pressure supply line 97 and low pressure return line 98. The servo is mounted to the pinion housing 49 using a servo adapter plate 99 and screws 101. A lower bearing 102 within pinion housing 49 rotatably supports a lower end 103 of pinion gear 92. As is shown most clearly in FIGS. 3 and 4, pinon gear 92 engages the toothed portion 27 of rack 26.

A left-hand hydraulic hard line 104 and a right-hand hydraulic hard line 106 have one end connected to respective servo output ports 107 and 108. Hard lines 104 and 106 are preferably manufactured from stainless steel for durability, and are specially bent during the manufacturing process into the shown configurations for use with the Mustang automobile. These configurations allow installation of the rack and pinion assembly 11 into the Mustang without mechanical interference with existing frame, engine, and steering components of that vehicle. Other motor vehicles, of course, may require different configurations for these hard lines.

The other end of the hard line 104 is threadably connected to inner end plug 34, by means of a hydraulic fitting 109. A TEFLON O-ring 111 is provided on the end of fitting 109 before it is installed, so as to provide a tight hydraulic seal between fitting 109 and rack tube 12. The other end of the hard line 106 is threadably connected to the outer end plug 43, using the right-angle hydraulic fitting 112 on the end of the line 106.

The last step in the assembly is the bolt connection of a left-hand tie rod 113 and a right-hand tie rod 114 to the center link 86. Owing to the compact configuration of the rack and pinion assembly 11, and the central location for the connection of the tie rods to the assembly, the original tie rods of the vehicle are used during the retrofit modification. Because the original tie rods are used, the improved performance of the rack and pinion assembly may be enjoyed without compromising the "bump steer" characteristics of the motor vehicle.

Figures 5, 5A:
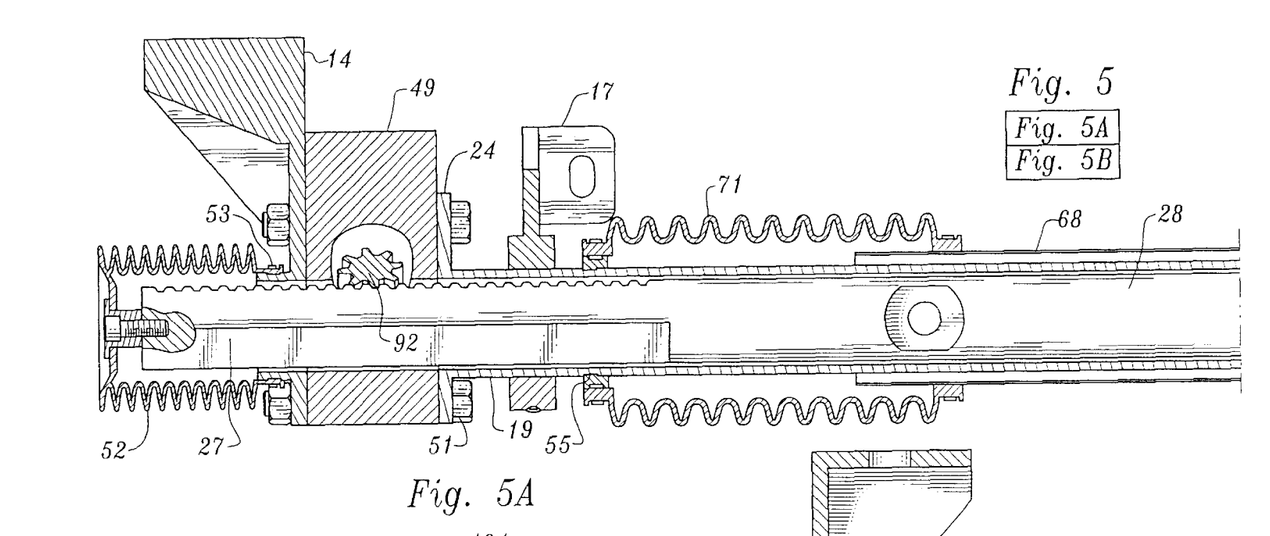
FIG. 5A is a fragmentary, longitudinal, cross-sectional view of the proximate end of the assembly, showing the rack in a stationary, intermediate position.
Figure 5B:
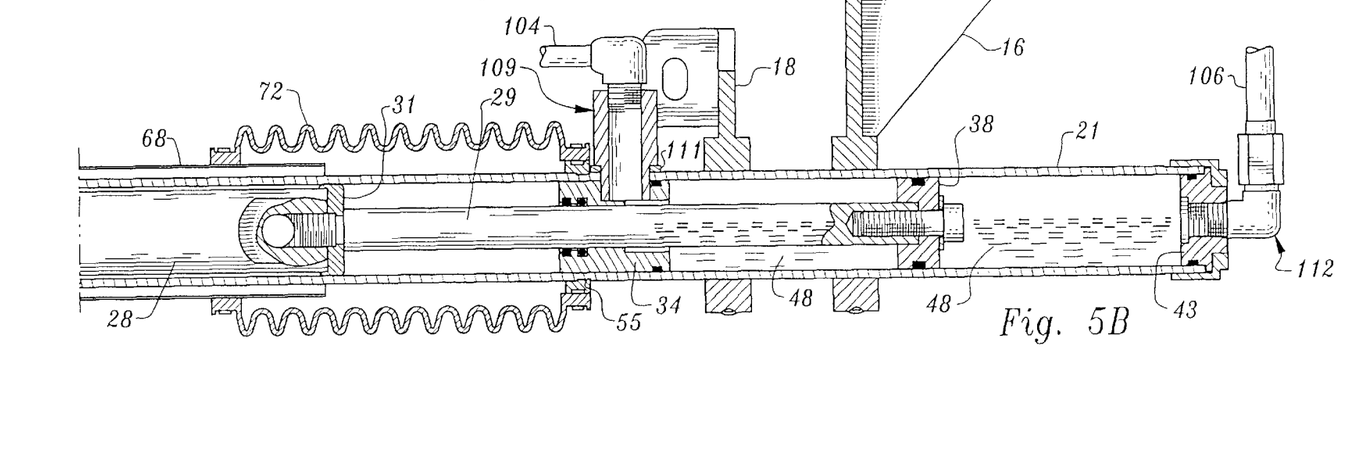
FIG. 5B is a fragmentary, longitudinal, cross-sectional view of the distal end of the assembly, showing the rack in a stationary, intermediate position.

The operation of the powered rack and pinion assembly 11 may best be understood by making reference to FIGS. 5A–7A and FIGS. 5B–7B. FIGS. 5A and 5B show the proximate and distal portions of the assembly, with the rack 26 in a stationary, intermediate position, such as when the vehicle is headed straight ahead. It should be noted in FIG. 5A that the toothed portion 27 of the rack extends somewhat past housing 49, and the outer bellows 52 is neither expanded nor compressed. In FIG. 5B, it should be noted that the plunger 38 is in a mid-way position, between inner end plug 34 and outer end plug 43. Also, because the rack is stationary, the hydraulic pressures within both portions of the chamber 48 are balanced and the hydraulic fluid is static.

Figures 6, 6A:
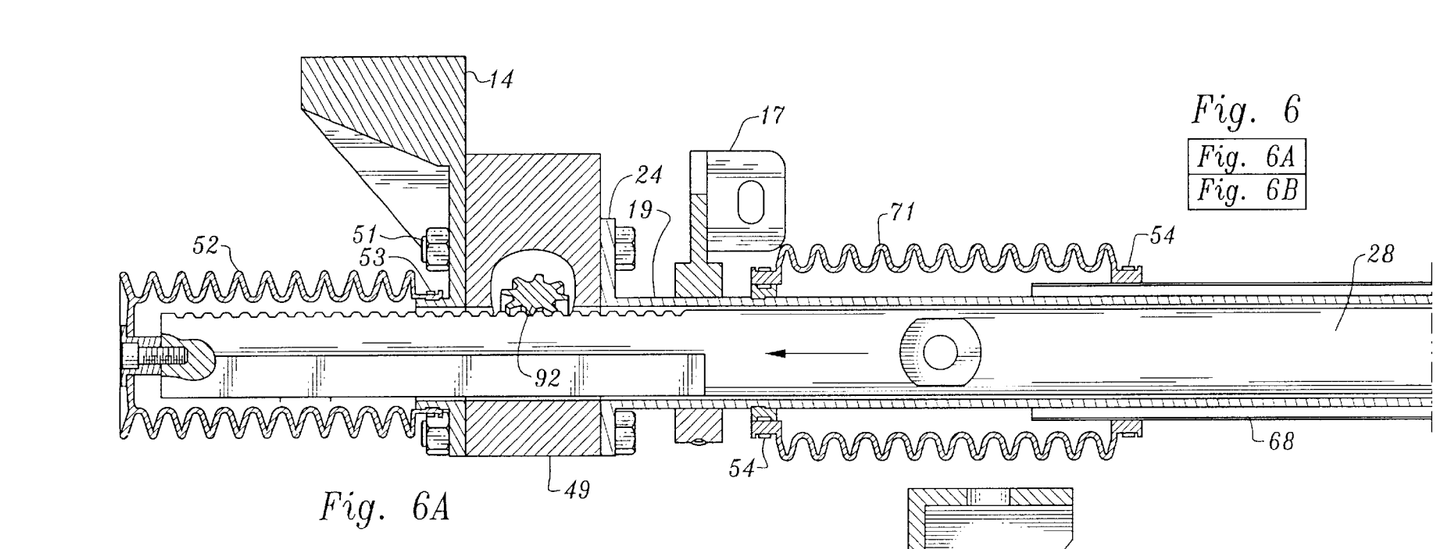
FIG. 6A is a view as in FIG. 5A, but with the rack moving into an extreme left-handed position.
Figure 6B:
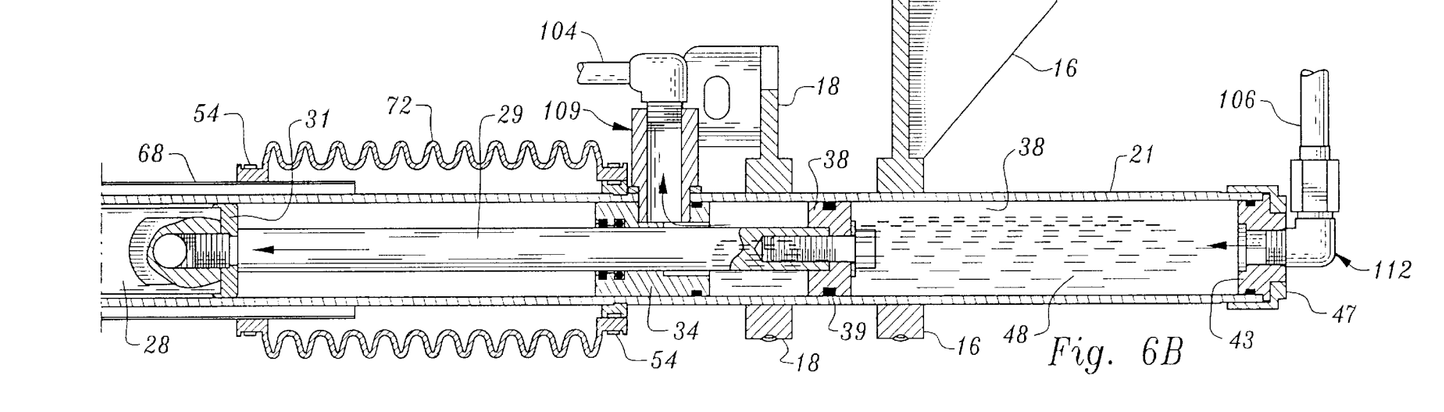
FIG. 6B is a view as in FIG. 5B, but with the rack moving into an extreme left-handed position.

In FIG. 6A, the rack is moving to an extreme left-hand position. The bellows 52 is approaching a fully expanded configuration, and the rack extends considerably past the pinion housing. To effect this movement, the counter-clockwise rotational forces applied to the steering wheel shaft have been imparted to the pinion gear 92 of the servo 89, which in turn has translated the rack to the left. Concurrently, as shown in FIG. 6B, the servo 89 has provided power-assist to the movement of the rack, by directing hydraulic fluid through right-hand hard line 106. Plunger 38 is accordingly driven to the left, as are the connected power shaft and rack. Fluid exits through fitting 109, and into left-hand hard line 104.

Figures 7, 7A:
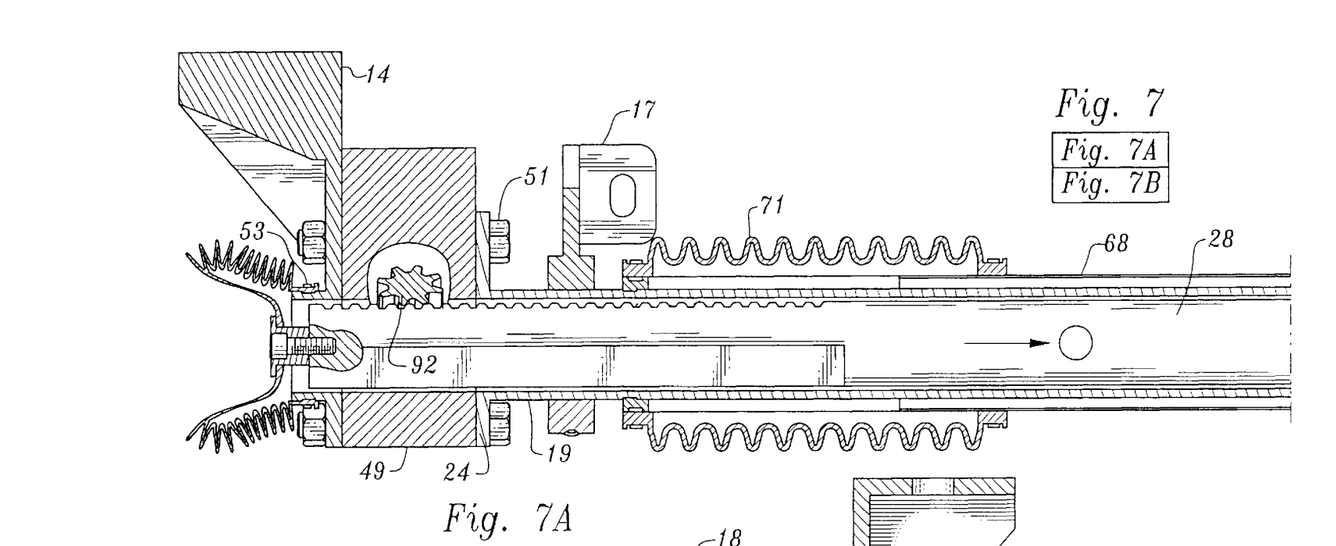
FIG. 7A is a view as in FIG. 5A, but with the rack moving into an extreme right-handed position.
Figure 7B:
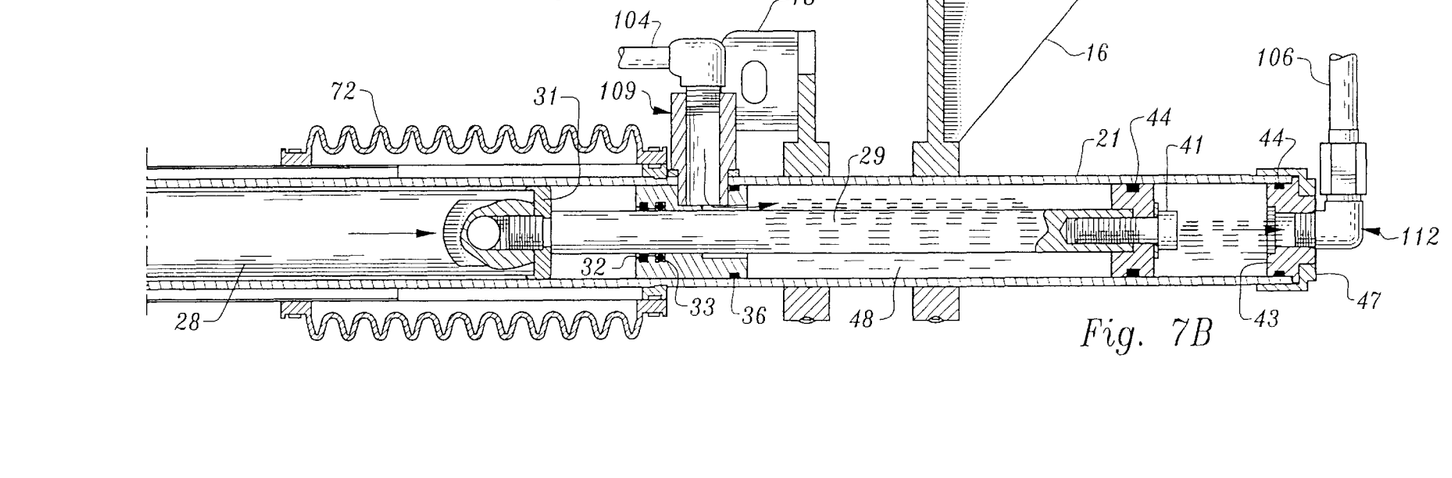
FIG. 7B is a view as in FIG. 5B, but with the rack moving into an extreme right-handed position.

Making reference now to FIG. 7A, the rack is moving to an extreme right-hand position. The bellows 52 is nearly fully compressed, and the rack is withdrawn to a position almost entirely within the pinion housing. The clockwise rotational forces applied to the steering wheel shaft have rotated the pinion gear 92, and driven the rack to the right. And, as shown in FIG. 7B, the servo has directed hydraulic fluid through the left-hand hard line 104. The plunger 38 is driven to the right, urging the power shaft and the rack in a like manner. Fluid exits through fitting 112, and into right-hand hard line 106.

Figures 8, 8A:
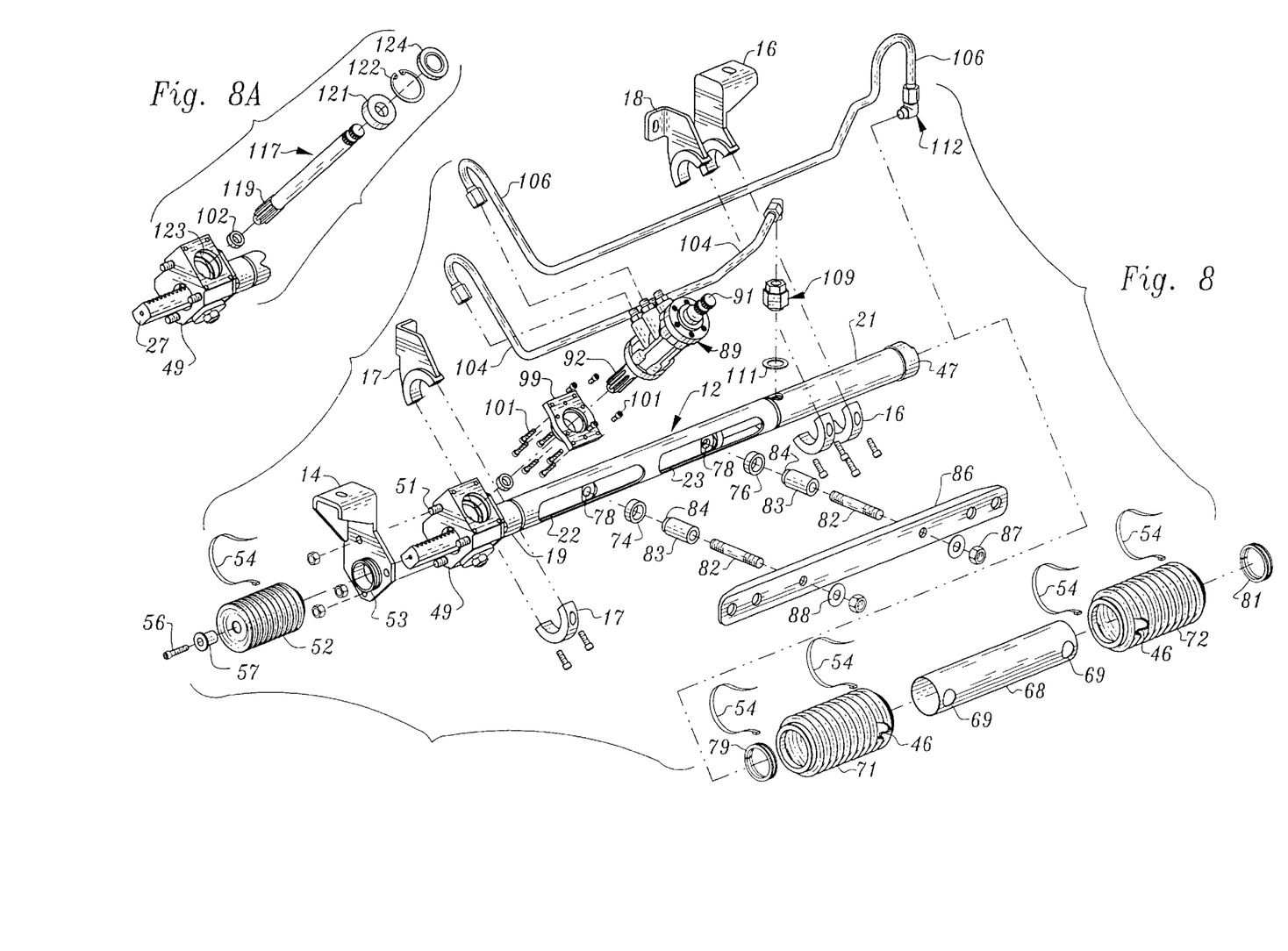
FIG. 8 is an exploded perspective view of the powered version of the rack and pinion assembly.
FIG. 8A is an exploded, detail insert view of the pinion housing of the manual version of the rack and pinion assembly.
Figures 10, 11:
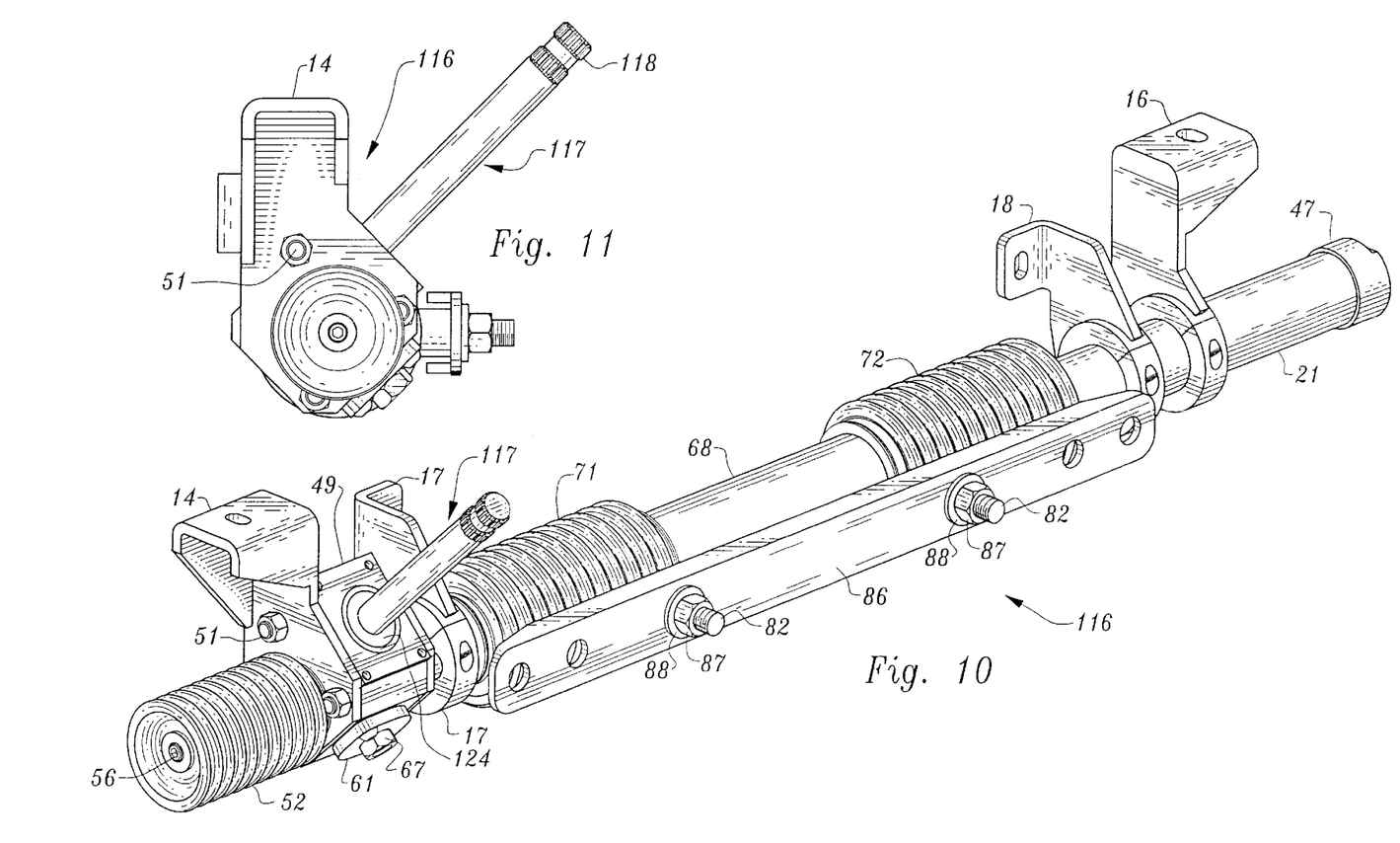
FIG. 10 is a left front perspective view of the manual version of the rack and pinion system of the present invention.
FIG. 11 is a left hand side elevational view of the system shown in FIG. 10; and, FIG. 12 is a fragmentary, perspective view taken from a low angle, showing the underside of a motor vehicle with the powered rack and pinion assembly of the present invention installed.

A manual rack and pinion assembly 116 is shown primarily in FIGS. 10 and 11. An exploded detail of the pinion housing arrangement for the assembly 116 is shown in FIG. 8A. The vast majority of the components used in the powered assembly 11 and the manual assembly 116, are identical, Therefore, where appropriate, the same numbering scheme is used to identify the same corresponding components in both assemblies. The principal differences lie in the elimination of the servo 89 and the associated hydraulic components, both outside and inside rack tube 12.

In lieu of the servo, a manual pinion 117 is provided. Pinion housing 49 includes a lower bearing 102, ideal to that used in the powered assembly 11. Pinion 117 has a spline 118 at its upper end, and an eight to other 119 at its lower end. The spline 118 is connected to a lower end of the steering wheel shaft by means of a universal coupler, as previously described. The pinion gear 119 is adapted to engage the toothed portion 27 of rack 26. A lower end of the pinion gear engages bearing 102, as set forth above. An upper bearing 121 is secured within housing 49 by means of a C-clip 122. An annular recess 123 is provided in the upper portion of the bore within housing 49, to accommodate C-clip 122. A dust seal 124 fits over the shaft of the pinion and snugly within the bore of the housing, to prevent dirt and dust from entering the pinion housing 49.

With the rack tube, the power shaft and all associated components are not used. A threaded screw is used to secure guide bushing 31 in place. In lieu of outlet end plug 43, an aluminum disc is provided, to seal the hole in end cap 47. A sidewall plug is also provided, to seal the hole in rack tube 12.

It will be appreciated, then, that I have disclosed two embodiments of a modular, rack and pinion assembly which may be bolt-installed in motor vehicles, to upgrade and improve their existing steering systems without impairing the factory "bump-steer" characteristics.

What is claimed is:

1. A manual rack and pinion assembly for use in a steering system of a motor vehicle, comprising:
   a. an elongated rack tube, said tube having a proximate end and a distal end and including at least one slot in its sidewall between said proximate end and said distal end, said slot having elongated, linear side walls, said side walls being parallel to each other and parallel to an axis of said rack tube;
   b. an elongated rack within said rack tube, said rack having a tooth portion within said proximate end and a shaft portion adjacent said slot;
   c. a center link;
   d. means passing through said slot, for interconnecting said shaft portion and said center link, said interconnecting means including a slide bushing mounted for rotation about an axis of a stud extending between said shaft portion and said center link, said slide bushing having a portion passing through said slot, said portion being sized slightly smaller than a transverse dimension of said slot to prevent rotation of said shaft portion of said rack; and,
   e. a pinion housing secured over said proximate end of said rack tube with at least some of said tooth portion of said rack passing therethrough, said pinion housing including a rotatable pinion having teeth on a lower end, said teeth being maintained in engagement with said tooth portion of said rack.

2. An assembly as in claim 1 including a pair of said slots, said pair of slots being elongated and sharing a common axis, and in which said interconnecting means comprises a pair of studs projecting transversely from said shaft portion of said rack, each stud passing through a respective said elongated slot.

3. An assembly as in claim 2, including a spacer mounted over each of said studs and extending between said shaft portion and said center link, each of said spacers having an inner end with a flat shoulder portion and a reduced outer diameter end section, said end section being in flush engagement with said shaft portion, and in which a respective said slide bushing is mounted over each of said outer diameter end sections and located within a respective one of said slots.

4. An assembly as in claim 3 in which said outer diameter end section of each said spacer has a longitudinal dimension which is slightly greater than an axial dimension of said slide bushing, allowing said slide bushing to rotate freely around said end section.

5. An assembly as in claim 2 including an elongated dust tube and a pair of inner bellows, each said inner bellows having inner ends attached to and extending from each end of said dust tube, said dust tube and said pair of inner bellows having inner diameters larger than an outer diameter of said rack tube, and further including a hole in each end of said dust tube and said inner ends of said attached inner bellows, through which said studs pass.

6. An assembly as in claim 5 in which said pair of inner bellows have outer ends, and further including bellows spacers between said rack tube and said outer ends of said pair of bellows.

7. An assembly as in claim 1, further including bracket means to attach said rack tube to a frame of the motor vehicle.

8. An assembly as in claim 7, in which said bracket means includes left and right frame brackets and left and right control arm brackets.

9. An assembly as in claim 7, in which said bracket means includes at least one bracket which includes a split ring adapted to be assembled from two parts which circumferentially surround a portion of said rack tube.

10. An assembly as in claim 1, including an outer bellows which extends between a side of said pinion housing and an end of said tooth portion of said rack.

11. An assembly as in claim 1, in which said rack tube and said rack have longitudinal axes and further including means to maintain said longitudinal axes in alignment.

12. An assembly as in claim 11, in which said means to maintain alignment comprises a rack bearing within said pinion housing and a rack bushing within said distal end of said rack tube.

13. A powered rack and pinion assembly for use in a steering system of a motor vehicle, comprising:
   a. an elongated rack tube, said tube having a proximate end and a distal end and including at least one slot in its sidewall between said proximate end and said distal end, said slot having elongated, linear side walls, said side walls being parallel to each other and parallel to an axis of said rack tube;
   b. an elongated rack within said rack tube, said rack having a tooth portion within said proximate end and a shaft portion adjacent said slot;
   c. a center link;
   d. means passing through said slot, interconnecting said shaft portion and said center link, said interconnecting means including a slide bushing mounted for rotation about an axis of a stud extending between said shaft portion and said center link, said slide bushing having a portion passing through said slot, said portion being sized slightly smaller than a transverse dimension of said slot to prevent rotation of said shaft portion of said rack;
   e. a pinion housing secured over said proximate end of said rack tube with at least some of said tooth portion of said rack passing therethrough, said pinion housing including a rotatable pinion having teeth on a lower end, said teeth being, maintained in engagement with said tooth portion of said rack; and,
   f. hydraulic drive means including a hydraulic ram within said distal end of said rack tube, said drive means being effective to translate said rack in response to rotation of said pinion.

14. An assembly as in claim 13 including a pair of said slots, said pair of slots being elongated and sharing a common axis, and in which said interconnecting means comprises a pair of studs projecting transversely from said shaft portion of said rack, each stud passing through a respective said elongated slot.

15. An assembly as in claim 14, including a spacer mounted over each of said studs and extending between said shaft portion and said center link, each of said spacers having an inner end with a flat shoulder portion and a reduced outer diameter end section, said end section being in flush engagement with said shaft portion, and in which a respective said slide bushing is mounted over each of said outer diameter end sections and located within a respective one of said slots.

16. An assembly as in claim 15 in which said outer diameter end section of each said spacer has a longitudinal dimension which is slightly greater than an axial dimension of said slide bushing, allowing said slide bushing to rotate freely around said end section.

17. An assembly as in claim 14 including an elongated dust tube and a pair of inner bellows, each said inner bellows having inner ends attached to and extending from each end of said dust tube, said dust tube and said pair of inner bellows having inner diameters larger than an outer diameter of said rack tube, and further including a hole in each end of said dust tube and said inner ends of said attached inner bellows, through which said studs pass.

18. An assembly as in claim 17 in which said pair of inner bellows have outer ends, and further including bellows spacers between said rack tube and said outer ends of said pair of bellows.

19. An assembly as in claim 13, further including bracket means to attach said rack tube to a frame of the motor vehicle.

20. An assembly as in claim 19, in which said bracket means includes left and right frame brackets and left and right control arm brackets.

21. An assembly as in claim 19, in which said bracket means includes at least one bracket which includes a split ring adapted to be assembled from two parts which circumferentially surround a portion of said rack tube.

22. An assembly as in claim 13, including an outer bellows which extends between a side of said pinion housing and an end of said tooth portion of said rack.

23. An assembly as in claim 13, in which said rack tube and said rack have longitudinal axes and further including means to maintain said longitudinal axes in alignment.

24. An assembly as in claim 23, in which said means to maintain alignment comprises a rack bearing within said pinion housing and a rack bushing within said distal end of said rack tube.

25. A powered rack and pinion assembly for use in a steering system of a motor vehicle, comprising:
   a. a rack tube, said tube having a proximate end and a distal end and including at least one slot in its sidewall between said proximate end and said distal end, said slot having elongated, linear side walls, said side walls being parallel to each other and parallel to an axis of said rack tube;
   b. an elongated rack within said rack tube, said rack having a tooth portion within said proximate end and a shaft portion adjacent said slot;
   c. an inner end plug within said distal end;
   d. an outer end plug within said distal end, said inner and outer plugs being spaced to define a hydraulic chamber within said distal end of said rack tube;
   e. a power shaft within said distal end of said rack tube, said power shaft having a connected end secured to said shaft portion of said rack, and a free end passing through said inner end plug into said hydraulic chamber, and including a hydraulic plunger on said free end;
   f. a center link;
   g. means passing through said slot, interconnecting said shaft portion and said center link, said interconnecting means including a slide bushing mounted for rotation about an axis of a stud extending between said shaft portion and said center link, said slide bushing having a portion passing through said slot, said portion being sized slightly smaller than a transverse dimension of said slot to prevent rotation of said shaft portion of said rack;
   h. a pinion housing secured over said proximate end of said rack tube with at least some of said tooth portion of said rack passing therethrough; and,
   i. hydraulic servo means for driving said rack in alternating, translational fashion, said servo means being mounted to said pinion housing and including a pinion gear maintained in engagement with said tooth portion of said rack and a spline, and further including hydraulic lines in communication with said hydraulic chamber.

26. A manual rack and pinion assembly for use in a steering system of a motor vehicle, comprising:
   a. an elongated rack tube, said tube having a proximate end and a distal end and including a pair of slots in its sidewall between said proximate end and said distal end, said slots being elongated a sharing a common axis;
   b. an elongated rack within said rack tube, said rack having a tooth portion within said proximate end and a shaft portion adjacent said slot;
   c. a center link;
   d. a pair of studs projecting transversely from said shaft portion of said rack, each stud passing through a respective said elongated slot, said studs interconnecting said shaft portion and said center link;
   e. a spacer mounted over each of said studs and extending between said shaft portion and said center link, each of said spacers having an inner end with a flat shoulder portion and a reduced outer diameter end section, said end section being in flush engagement with said shaft portion, and further including a slide bushing mounted over each of said outer diameter end sections and located within a respective one of said slots; and,
   f. a pinion housing secured over said proximate end of said rack tube with at least some of said tooth portion of said rack passing therethrough, said pinion housing in including a rotatable pinion having teeth on a lower end, said teeth being maintained in engagement with said tooth portion of said rack.

27. An assembly as in claim 26 in which said outer diameter end section of each said spacer has a longitudinal dimension which is slightly greater than an axial dimension of said slide bushing, allowing said slide bushing to rotate freely around said end section.

28. An assembly as in claim 26 including an elongated dust tube and a pair of inner bellows, each said inner bellows having inner ends attached to and extending from each end of said dust tube, said dust tube and said pair of inner bellows having inner diameters larger than an outer diameter of said rack tube, and further including a hole in each end of said dust tube and said inner ends of said attached inner bellows, through which said studs pass.

29. An assembly as in claim 28 in which said pair of inner bellows have outer ends, and further including bellows spacers between said rack tube and said outer ends of said pair of bellows.

30. A powered rack and pinion assembly for use in a steering system of a motor vehicle, comprising:
   a. an elongated rack tube, said tube having a proximate end and a distal end and including a pair of slots in its sidewall between said proximate end and said distal end, said slots being elongated and sharing a common axis;
   b. an elongated rack within said rack tube, said rack having a tooth portion within said proximate end and a shaft portion adjacent said slot;
   c. a center link;
   d. a pair of studs projecting transversely from said shaft portion of said rack, each stud passing through a respective said elongated slot, said studs interconnecting said shaft portion and said center link;
   e. a spacer mounted over each of said studs and extending between said shaft portion and said center link, each of said spacers having an inner end with a flat shoulder portion and a reduced outer diameter end section, said end section being in flush engagement with said shaft portion, and further including a slide bushing mounted over each of said outer diameter end sections and located within a respective one of said slots;
   f. a pinion housing secured over said proximate end of said rack tube with at least some of said tooth portion of said rack passing therethrough, said pinion housing including a rotatable pinion having teeth on a lower end, said teeth being maintained in engagement with said tooth portion of said rack; and,
   g. hydraulic drive means including a hydraulic ram within said distal end of said rack tube, said drive means being effective to translate said rack in response to rotation of said pinion.

31. An assembly as in claim 30 in which said outer diameter end section of each said spacer has a longitudinal dimension which is slightly greater than an axial dimension of said slide bushing, allowing said slide bushing to rotate freely around said end section.

32. An assembly as in claim 30 including an elongated dust tube and a pair of inner bellows, each said inner bellows having inner ends attached to and extending from each end of said dust tube, said dust tube and said pair of inner bellows having inner diameters larger than an outer diameter of said rack tube, and further including a hole in each end of said dust tube and said inner ends of said attached inner bellows, through which said studs pass.

33. An assembly as in claim 32 in which said pair of inner bellows have outer ends, and further including bellows spacers between said rack tube and said outer ends of said pair of bellows.

34. A manual rack and pinion assembly for use in a steering system of a motor vehicle, comprising:
   a. an elongated rack tube, said tube having a proximate end and a distal end and including a pair of slots in its sidewall between said proximate end and said distal end;
   b. an elongated rack within said rack tube, said rack having a tooth portion within said proximate end and a shaft portion adjacent said slots;
   c. a center link;
   d. means passing through said slots, for interconnecting said shaft portion and said center link, said interconnecting means including a pair of studs projecting transversely from said shaft portion of said rack, each stud passing through a respective said elongated slot, said interconnecting means further including a spacer mounted over each of said studs and extending between said shaft portion and said center link, each of said spacers having an inner end with a flat shoulder portion and a reduced outer diameter end section, said end section being in flush engagement with said shaft portion, and further including a slide bushing mounted over each of said outer diameter end sections and located within a respective one of said slots.

35. An assembly as in claim 34 in which said outer diameter end section of each said spacer has a longitudinal dimension which is slightly greater than an axial dimension of said slide bushing, allowing said slide bushing to rotate freely around said end section.

36. A manual rack and pinion assembly for use in a steering system of a motor vehicle, comprising:
   a. an elongated rack tube, said tube having a proximate end and a distal end and including a pair of slots in its sidewall between said proximate end and said distal end;
   b. an elongated rack within said rack tube, said rack having a tooth portion within said proximate end and a shaft portion adjacent said slots;
   c. a center link;
   d. means passing through said slots, for interconnecting said shaft portion and said center link, said interconnecting means including a pair of studs projecting transversely from said shaft portion of said rack, each stud passing through a respective said elongated slot; and,
   e. an elongated dust tube and a pair of inner bellows, each said inner bellows having inner ends attached to and extending from each end of said dust tube, said dust tube and said pair of inner bellows having inner diameters larger than an outer diameter of said rack tube, and further including a hole in each end of said dust tube and said inner ends of said attached inner bellows, through which said studs pass.

37. An assembly as in claim 36 in which said pair of inner bellows has outer ends, and further including bellows spacers between said rack tube and said outer ends of said pair of bellows.

38. A powered rack and pinion assembly for use in a steering system of a motor vehicle, comprising:
   a. an elongated rack tube, said tube having a proximate end and a distal end and including a pair of slots in its sidewall between said proximate end and said distal end, said pair of slots being elongated and sharing a common axis;
   b. an elongated rack within said rack tube, said rack having a toothed portion within said proximate end and a shaft portion adjacent said slot;
   c. a center link;
   d. means passing through said slots, for interconnecting said shaft portion and said center link, said interconnecting means including a pair of studs projecting transversely from said shaft portion of said rack, each stud passing through a respective said elongated slot, said interconnecting means further including a spacer mounted over each of said studs and extending between said shaft portion and said center link, each of said spacers having an inner end with a flat shoulder portion and a reduced outer diameter end section, said end section being in flush engagement with said shaft portion, and further including a slide bushing mounted over each of said outer diameter end sections and located within a respective one of said slots;

e. a pinion housing secured over said proximate end of said rack tube with at least some of said tooth portion of said rack passing therethrough, said pinion housing including a rotatable pinion having teeth on a lower end, said teeth being maintained in engagement with said tooth portion of said rack; and, f. hydraulic means including a hydraulic ram within said distal end of said rack tube, said drive means being effective to translate said rack in response to rotation of said pinion.

39. An assembly as in claim 38 in which said outer diameter end section of each said spacer has a longitudinal dimension which is slightly greater than an axial dimension of said slide bushing, allowing said slide bushing to rotate freely around said end section.

40. An assembly as in claim 14 including an elongated dust tube and a pair of inner bellows, each said inner bellows having inner ends attached to and extending from each end of said dust tube, said dust tube and said pair of inner bellows having inner diameters larger than an outer diameter of said rack tube, and further including a hole in each end of said dust tube and said inner ends of said attached inner bellows, through which said studs pass.

41. An assembly as in claim 40 in which said pair of bellows has outer ends, and further including bellows spacers between said rack tube and said outer ends of said pair of bellows.

* * * * *